United States Patent [19]

Despres

[11] Patent Number: 4,928,486
[45] Date of Patent: May 29, 1990

[54] VARIABLE-FORCE CLAMPING MECHANISM BETWEEN TORQUE-VARIATION DAMPING FLYWHEEL AND TORQUE CONVERTER

[75] Inventor: Dominique Despres, Clichy, France
[73] Assignee: Valeo, Paris, France
[21] Appl. No.: 224,988
[22] Filed: Jul. 27, 1988
[30] Foreign Application Priority Data Jul. 29, 1987 [FR] France .................... 87 10750

[51] Int. Cl.[5] .................. F16H 45/02; F16F 15/12
[52] U.S. Cl. ........................... 60/338; 74/574; 192/106.2; 464/68
[58] Field of Search ............ 60/338; 74/574; 192/106.2; 464/66, 68

[56] References Cited

U.S. PATENT DOCUMENTS

| | | | |
|---|---|---|---|
| 4,663,983 | 5/1987 | Kobayashi et al. | 74/574 |
| 4,714,449 | 12/1987 | Woerner et al. | 74/574 |
| 4,724,719 | 2/1988 | Wërner et al. | 74/574 |
| 4,727,767 | 3/1988 | Aiki et al. | 74/574 |
| 4,747,801 | 5/1988 | Chasseguet et al. | 74/574 |
| 4,748,868 | 6/1988 | Kobayashi et al. | 74/574 |
| 4,767,380 | 8/1988 | Chasseguet et al. | 74/574 |

FOREIGN PATENT DOCUMENTS

| | | |
|---|---|---|
| 0082589 | 6/1983 | European Pat. Off. . |
| 0103267 | 3/1984 | European Pat. Off. . |
| 259173 | 3/1988 | European Pat. Off. ......... 192/106.2 |
| 2595075 | 9/1987 | France . |
| 2045367 | 10/1980 | United Kingdom . |
| 2152188 | 7/1985 | United Kingdom . |

Primary Examiner—Robert E. Garrett
Assistant Examiner—George Kapsalas
Attorney, Agent, or Firm—Charles E. Brown; Charles A. Brown

[57] ABSTRACT

In a damping flywheel which is associated with a fluid coupling device, the casing of the fluid coupling device is mounted in series with the damping flywheel, preferably through a resilient elment which forms part of an arrangement which allows variation to take place in the clamping torque exerted by friction means which form part of a torque limiter.

8 Claims, 2 Drawing Sheets

VARIABLE-FORCE CLAMPING MECHANISM BETWEEN TORQUE-VARIATION DAMPING FLYWHEEL AND TORQUE CONVERTER

BACKGROUND OF THE INVENTION

1. Field of the Invention

The invention relates to a device for torque transmission, and is concerned more particularly with a device of this kind which includes a fluid coupling device, which is generally interposed in an automotive vehicle between a driving shaft such as the engine crankshaft and a driven shaft such as the input shaft of an automatic gearbox, so as to perform the function of a clutch.

2. Description of the Prior Art

A torque transmitting device of this kind is known, which includes, housed in a common casing and rotating in parallel, a hydraulic coupling member or torque converter together with a mechanical clutch of the kind known as a locking clutch.

Such a torque transmitting device is for example described in British Patent Application No. GB-A-2 045 367.

In this construction, the clutch is, on starting and generally at each change of transmission ratio, ineffective during an initial period of time. It is therefore the hydraulic coupling that is initially left to act between the input shaft or crankshaft and the output shaft (the input shaft of the gearbox). During a second period of time, the clutch causes the hydraulic coupling to be taken out of service so as to eliminate any slip in the hydraulic coupling, thus improving the performance of the assembly by ensuring direct mechanical coupling between the two shafts.

During this second stage, the hydraulic system is thus bypassed.

In other forms of the device, the hydraulic coupling is arranged in the rotating casing, while the clutch is situated outside the casing.

In this case, two concentric driven shafts are provided, and transmission of the torque is obtained alternatively through one or the other of these driven shafts, so that the torque is transmitted either through the hydraulic system or through the mechanical system.

More precisely, one of the driven shafts is connected in rotation to the casing and is surrounded by a second driven shaft, which is connected in rotation to a turbine wheel of the hydraulic coupling.

In the remainder of this document, such an assembly will for convenience be referred to as a "fluid coupling device", which may consist of a torque conversion apparatus or of a simple coupling device. Activation of the clutch, that is to say of the mechanical device for locking the two shafts together, is obtained through hydraulic control for any chosen speed. In general, it is desirable to choose a speed at which this locking is to take place which is quite small, for energy conservation reasons; however, in achieving this there is a risk of encountering all the conventional vibration problems, which are mainly due to torsional oscillations originating from the engine. A principal object of the invention is to overcome this disadvantage, and to provide a torque transmission device of the fluid type, in which mechanical locking together of the two shafts takes place at a low speed.

SUMMARY OF THE INVENTION

The invention accordingly provides a torque transmitting device, which is characterised in that it comprises a rotatable coupling means in series with a flywheel having torsion damping, and with a fluid coupling device. It should be noted that the fluid coupling device is in accordance with the definition which is given above.

In more detail, the said fluid coupling device is assembled with a rotatable output part of the said damping flywheel.

This arrangement allows the mechanical clutch, or the driving element of the fluid coupling device, to be simplified, and the fluid coupling device to be reduced to its simplest form, since a damping flywheel includes resilient means.

In addition, it is known that in operation, the casing of a coupling device of this kind is subjected on the one hand to a thrust towards the driving shaft, and on the other hand, to deformations which mainly consist of expansion of its volume, due to a kind of inflation under the effect of the oil pressure within it.

These forces act simultaneously, to produce an axial thrust of the casing towards the drive shaft and expansion of the casing due to the establishment of the static oil pressure within the casing, the system being supplied with oil by a feed pump.

It should also be noted that a supplementary inflationary expansion occurs due to the dynamic pressure which is generated during operation, this expansion being dependent on speed.

In addition, one of the bladed wheels of the hydraulic coupling is secured to the casing of the fluid coupling device, in such a way that this casing naturally constitutes one of the elements through which the coupling device and the damping flywheel are assembled together. The damping flywheel conventionally includes friction means. These first of all comprise friction surfaces which act only under extreme operating conditions and which constitute a torque limiter. The friction means also constitute frictional damping means, which act over a certain angular sector defined between two rotatable parts, which are coupled together in rotation through springs. The action of these friction damping means is combined with that of the springs to ensure that torsional oscillations are removed.

In another aspect, the invention consists in taking advantage of the thrust and/or of the deformations of the casing of the fluid coupling device, in order to allow the clamping effect of these friction means, or of at least certain of them, to be varied in a desired direction according to the operating conditions.

With this in view, the invention also provides a torque transmitting device as defined above, and in which the damping flywheel includes at least one friction means, characterised in that a clamping means, adapted so as in operation to modify the clamping torque of the said friction means, is interposed between the casing of the fluid coupling device and the friction means. For this purpose the clamping means includes a resilient member.

In one possible embodiment, the resilient element forms part of the mounting means for assembling the damping flywheel and the coupling device together.

In the case in which the friction means concerned constitute a torque limiter, the invention proposes that the mounting means between the damping flywheel and the fluid coupling device be modified in such a way that the clamping torque of these friction means will increase with speed. Thus, these friction means follow, on starting, the development of the engine torque. On the other hand, in the case in which the friction means concerned are damping friction means, the mounting means could be such that the clamping torque of these friction means, having been high at starting, diminishes rapidly as the speed increases. In this way, high friction can be obtained at starting, and this allows the two parts of the damping flywheel to be locked together and thus allows the undesirable phenomena occuring at starting and stopping of the engine to be satisfactorily overcome. However, this mounting means may be such that an increase in the clamping torque of the torque limiter, and a reduction in that of the damping friction means, are caused to take place simultaneously.

The invention will be better understood, and further advantages thereof will appear more clearly, in the light of the description which follows, and which describes by way of example several possible embodiments of a torque transmitting device according to the principle of the invention.

DESCRIPTION OF THE PREFERRED EMBODIMENTS

Figure 1:
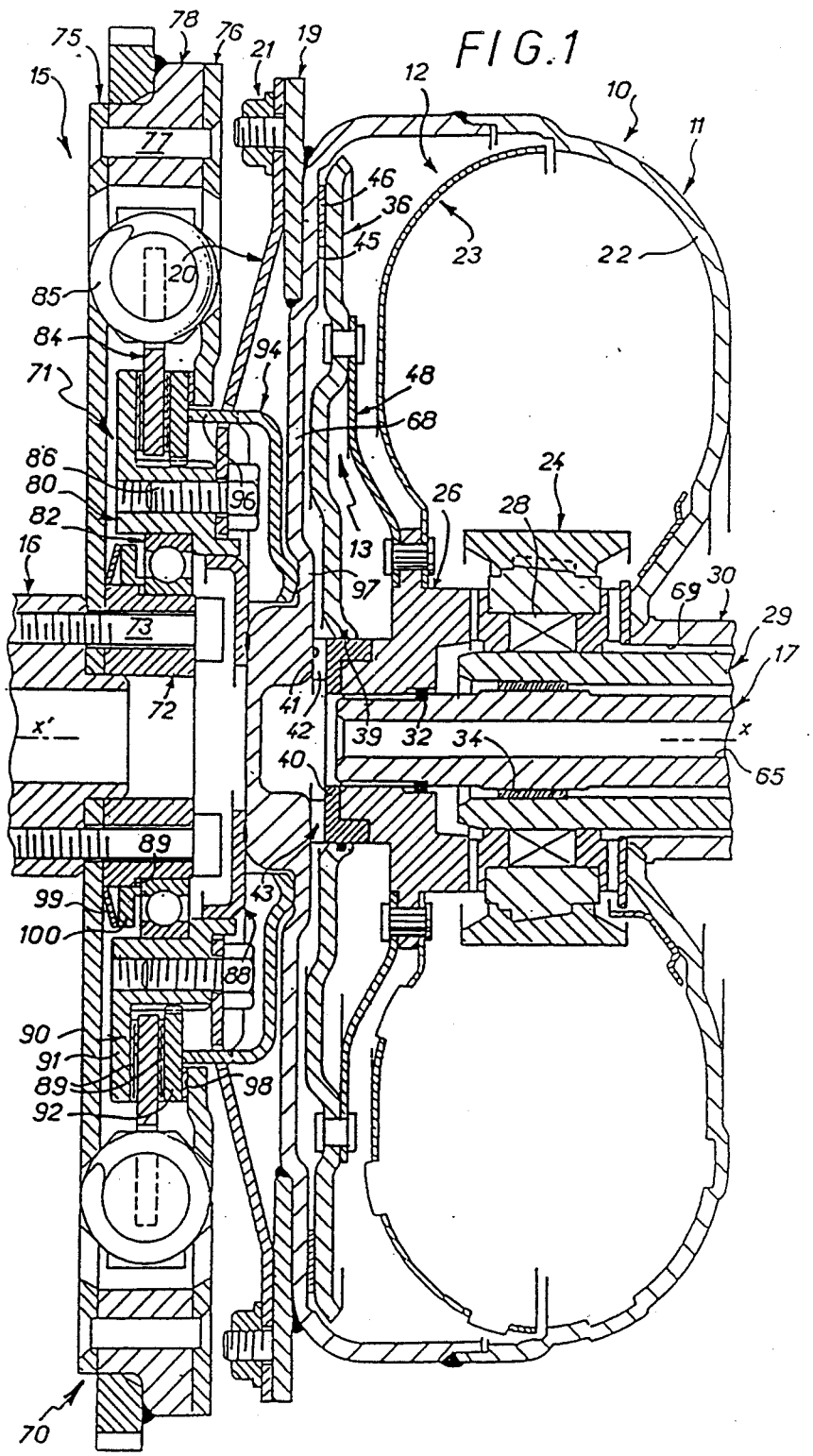
FIG. 1 is a general view, in cross section, showing a device in accordance with the principle of the invention.
Figure 2:
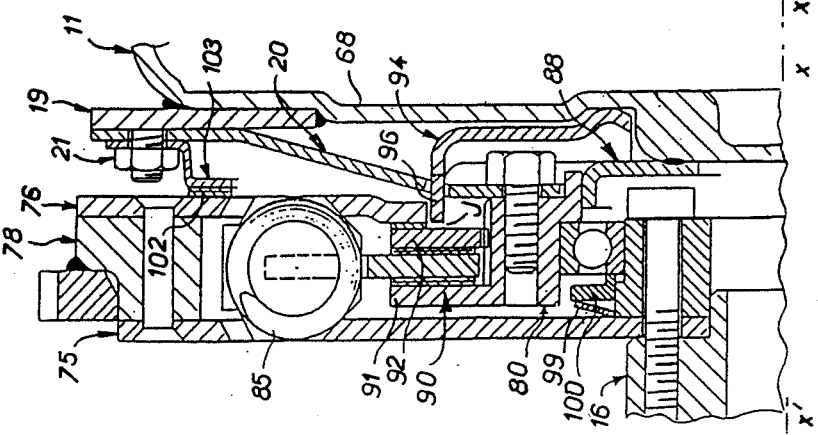
FIG. 2 is a partial view, corresponding to a portion of FIG. 1 but showing a first alternative embodiment.

With reference more particularly to FIGS. 1 and 2, a fluid coupling device 10 is shown which includes, in a common casing 11, a hydraulic coupling 12 and a torque transmitting clutch 13.

In accordance with one major feature of the invention, a damping flywheel 1 is associated with the fluid coupling device 10 so as to constitute a transmission between a driving shaft 16, for example the crank shaft of an internal combustion engine, and a driven shaft 17, which is for example the input shaft of a gearbox. The assembly is mainly adapted for inclusion in a vehicle which has an automatic or semi automatic gearbox.

The casing 11 is rotatable, and it is by means of this casing that the flywheel 15 and the coupling device 10 are mounted in series. To this end, pads 19 are secured, for example by welding, to the casing 11 on the same side of the latter as the damping flywheel 15, while a resilient metallic element 20, which is fixed to these pads on the outside of the latter, for example by means of studs 21, provides the means whereby the damping flywheel 15 and the coupling device 10 are coupled together for simultaneous rotation. In this example, this metallic element 20 takes the form of a diaphragm for transmitting the drive and being deformable in the axial direction x'x of the torque transmitting device itself.

The hydraulic coupling 12 and the clutch 13 are arranged in parallel with each other between an input element on the one hand, which comprises the rotatable casing 11, and on the other hand an output element which in the example shown comprises a hub 26. The hub 26 is secured to the shaft 17, for rotation therewith, by a splined connection provided for this purpose between the tubular hub 26 and the shaft 17.

The hydraulic coupling 12 is a torque converter. In this connection it includes, besides an impeller wheel 22 and a turbine wheel 23, a reaction wheel 24. As has been mentioned above, the coupling 12 can be made more simple and can be reduced merely to a coupling member without the reaction wheel which allows torque conversion to be obtained. The turbine wheel 23 is carried by the hub 26.

Finally, the reaction wheel 24 is itself carried, by means of a freely mounted ring 28, on a tubular hub 29 which extends coaxially around the shaft 17, between the latter and a sleeve 30 which is fixed to the rotatable casing 11. A seal 32 is provided between the hub 26 and the shaft 17. Similarly, a bearing 34, which includes sealing means, is provided between the shaft 17 and the hub 29. The clutch 13 includes a coupling element 36 which takes the form of an annular face plate which is mounted so as to be movable axially on a support ring 40, giving a piston-like mounting which is sealed by means of a seal 39. The support ring 40, which has an L-shaped transverse cross section, is fitted on to the hub 26 by means of its axial flange, and is centered by means of the latter. In addition, it is supported in abutting relationship between the tubular hub 26 and a radial surface portion 41 of the rotatable casing 11 through axial projections 42 of the ring 40, which are in contact with the casing 11 and which define between them radial passages 43 through which fluid can circulate.

The coupling element 36 carries, arranged in the form of a ring as its outer periphery and facing an annular surface portion 45 of the rotatable casing 11, a friction liner 46 whereby it is adapted to be brought by friction into solid engagement with the rotatable casing 11, for rotation therewith. In an alternative arrangement, the friction liner may be carried by the rotatable casing, or it may be a floating liner.

Between the coupling element 36 and the hub 28 there is a connection which in this example is resilient, comprising simply an axially deformable resilient web 48, which is fixed by means of rivets between the said coupling element 36 and the said hub 26. This web may advantageously be cut in such a way as to define a series of fingers, not shown in FIG. 1, which allow the axial resilience of the connection to be increased.

The output shaft 17 is made hollow by the provision of an axial passage 65. When the clutch 13 is being disengaged, oil under pressure is admitted through this passage 65, and through the radial passages 43, so as to penetrate into the space defined between the rotatable casing 11 and the coupling element 36. This forces the coupling element to move away from the casing, so that it ceases to be coupled for rotation with the latter, having regard to the fluid sealing provided by the seals 32 and 39 and the bearing 34. After the oil has circulated across the hydraulic coupling 12, it is returned to an appropriate receptacle through a passage 69 which is formed between the tubular hub 29 and the sleeve 30 of the rotatable casing 11.

By contrast, when the clutch 13 is being engaged, oil under pressure is admitted so as to enter the hydraulic coupling 12 through this passage 69. The oil thus circulates within the interior of the rotatable casing 11 and passes through the radial passages 43 and the axial passage 65, so that its flow progressively drives the coupling element 36 and finally forcibly impinges against the annular surface portion 45 of the rotatable casing 11.

Having regard to the sealing effect provided by the seals 32 and 39 and by the bearing 34, the result of this is that, on the one hand, the return circuit of the oil is interrupted, so that the oil supply thus becomes simply a supply for filling the sealed volume thus confined, and on the other hand, the rotatable casing 11 becomes directly coupled by friction with the driven shaft 17 for rotation of the latter therewith, the casing 11 being driven in rotation by the damping flywheel 15. In other words, the hydraulic coupling 12 is then ineffective, so that all slip in the coupling device is eliminated.

It should be noted at this stage of this description, that when the feed pump is started on the one hand, and as a function of speed on the other hand, the casing 11 undergoes a thrust which is directed in the axial direction towards the crank shaft, together with deformations which are due to a certain degree of expansion due to inflation. These effects are put to good use within the scope of the invention so as to improve the features of the damping flywheel 15 which will now be described.

The damping flywheel 15, in the conventional way, comprises two coaxial parts 70 and 71, which are rotatably mounted around the common axis x'x of the torque transmitting device. The rotatable part 70 is the input part, and comprises an annular hub 72 which is fixed by means of screws 73 to the shaft 16. It also includes two annular plates 75 and 76, which are spaced from each other and which are mounted coaxially with the axis x'x. The plates 75 and 76 are fixed to each other externally, for example by means of rivets 77 with an annular spacer member 78 interposed between them. The spacer member 78 is of substantial mass. The plate 75 extends in the radial direction as far as the hub 72, and is fixed between the latter and a shoulder of the shaft 16 by means of studs 73. The hub 72 and the plate 75 include, respectively, holes through which the studs 73 pass, these holes being spaced at regular intervals around a pitch circle. The studs 73 are secured in threaded holes in the shaft 16.

The rotatable part 72 constitutes the output part of the flywheel, and includes a hub 80 which surrounds the hub 72, with a ball bearing 82 interposed between them. The output part 71 of the flywheel also includes an annular face plate 84 which is normally coupled with the hub 80, for rotation therewith, through a torque limiter. Resilient means, arranged to act circumferentially and comprising a series of springs 85, are mechanically interposed between the coaxial parts 70 and 71. These springs, which are helical in form, are compression springs, and in this example they are mounted so as to be actuated in response to relative rotation between the plates 75 and 76 on the one hand and the face plate 84 on the other hand, in the usual way.

The resilient element 20 is fixed to the hub 80 by means of studs 86 in the vicinity of its inner periphery. The fluid coupling device 10 is supported as an axial extension of the damping flywheel 15, by means of an annular support plate 88 which is L-shaped in cross section and welded to the casing 11; this support plate includes a cylindrical support flange which is slidably mounted in the axial bore of the hub 80. The outer cage of the rolling bearing 82 is also mounted in a part of this bore having a corresponding diameter, and is in abutting engagement, on its side nearest to the coupling device 10, with a shoulder formed in the said bore. The inner cage of the bearing 82 is slidably mounted on an outer cylindrical surface of the hub 72, with its displacement towards the shaft 16 being limited by means of a shoulder 89a. The damping flywheel also includes, in the usual way, two kinds of friction means, namely:

firstly, friction means which are part of a torque limiter interposed between two elements of one of the rotatable parts mentioned above, and secondly, friction means which are part of the damping means, and the effect of which is combined with that of the springs, these friction means then being interposed between the said rotatable parts themselves.

In accordance with another major feature of the invention, a means for obtaining the clamping or coupling engagement of such friction means (of either one of the above mentioned kinds) of the said damping flywheel includes a resilient element which is adapted to modify their clamping engagement as a function of the thrusts and/or of the deformations of the casing 11 of the said fluid coupling device with these friction means, in a desired direction as a function of the operating conditions of the device, and particularly as a function of the speed of rotation. In the example described here, this resilient element is none other than the element 20 which connects the damping flywheel to the coupling device; the said resilient element 20 is mounted with preloading.

Thus, in this example, the torque limiter 90 comprises two friction rings 89 which are mounted on either side of the face plates 84, together with two annular flanges 91 and 92 which are rotatable with the hub 80. The flange 91 consists of a radial extension of the hub itself, while the flange 92 is movable axially with respect to the flange 91, being coupled for rotation with the hub 80 through a series of splines. A thrust member 94 which is relatively rigid is interposed between the fluid coupling device 10 and the movable flange 92.

To this end, the thrust member 94 has finger portions 96 (which are oriented substantially parallel with the axis x'x and which are preferably spaced apart at regular intervals circumferentially). The finger portions 96 extend through corresponding openings or slots formed in the resilient element 20. The said thrust member 94 thus engages against the movable flange 92 through its finger members 96. It also bears, through a bead formed in its radially inner part, against an annular zone 97 of that wall of the casing 11 which is nearest to the damping flywheel 15 and which is relatively close to the axis x'x.

In addition, the friction means which form part of the said damping means include firstly a friction ring 98 interposed between the flywheel plate 76 and the movable flange 92, and secondly a resilient preloading element 99 (which in this example consists of a Belleville washer), interposed between the flywheel plate 75 of the rotating part 70 and the whole of the other rotating part 71. In the embodiment shown in FIG. 1, the resilient element 99 exerts its force on the inner cage of the rolling bearing 82, which is in abutment against a shoulder of the hub 80 through its outer cage. The resilient element 99 transmits this force through a ring member 100 of L-shaped profile, which can slide on the hub 72.

Operation takes place as follows.

The activation of the oil feed pump (not shown), which supplies oil to the fluid coupling device 10, sets up within the latter a static pressure, the effects of which are seen in the following way.

Firstly, it causes an axial thrust to be set up in the fluid coupling device in a direction towards the input shaft 16, and this is transmitted, via the thrust member 94, on to the movable flange 92 so as to act in opposition to the thrust exerted on the friction ring 98 by the resilient washer 99. If the axial thrust in the fluid coupling device exceeds the thrust exerted by the resilient washer 99, an overall displacement is produced, until the bearing 82 abuts at 89a against the hub 80, the torque limiter assembly, the resilient element 20 and the casing 11, in such a way that there is no further force on the friction ring 98.

Secondly, the above mentioned static pressure gives rise to deformation, due to inflation, of the rotatable casing 11, which sets up a biasing force on the resilient element 20 towards the right as seen in FIG. 1, with this biasing force acting on the outer portion of the resilient element 20 through the pads 19. This new biasing force acts so as to reinforce the clamping torque of the torque limiter 90, through the clamping means which includes the thrust member 94, the torque limiter assembly 90, the hub 80, the resilient element 20 and the wall 68 of the casing 11. It will therefore be seen that this supplementary clamping effect has no action on the ball bearing 82. In operation, the inflation of the casing 11 is increased to the extent that the speed increases, and this again adds to the clamping or coupling exerted by the torque limiter by operation of the said clamping assembly In other words, it will clearly be seen that the resilient element 20 is mounted in such a way that, when clamping is set up, this causes the clamping effect of the torque limiter to be increased as a function of an increase in the speed of rotation of the coupling device as a whole.

In FIG. 2, those structural elements which are analagous to those in FIG. 1 carry the same reference numerals. The damping friction means are completed by a further friction ring 102 which is interposed between the Plate 76 of the damping flywheel, and an annular flange 103 which is fixed to the casing 11 of the said fluid coupling device 10. This flange is secured to the resilient element 20, and assembled with the pads 19 by means of the bolts 21. The friction ring may be fixed to the plate 76 or alternatively to the flange 103. The friction developed at the level of this friction ring 102 is relatively large on starting (displaying strong hysteresis), in view of its large mean diameter. This friction is in practice equivalent to a locking action between the damping flywheel and the rotatable casing 11. The point of resonance of the damping flywheel, which, on starting, occurs at a speed lower than that of slow running, is thus quite easily eliminated. A small clearance J may be provided in the mounting between the free ends of the fingers 96 of the thrust member 94 and the movable flange 92 of the torque limiter. In this way a change may be observed in the clamping effect to the extent that the speed of the device increases. On starting, the "clamping means" comprises the hub 80, the torque limiter 90 in its entirety, the plate 76, the friction ring 102, the flange 103, and the resilient element 20 which is preloaded against the mounting so as to increase the damping friction. When the casing becomes deformed in the way described above, increasingly with speed of rotation, the thrust member 94 moves during a first phase towards the movable flange 92 until it comes into engagement with the latter. During this first phase, the clamping effect remains unchanged. Then however, during a second phase, a second "clamping means" comes into play, comprising the torque limiter in its entirety, the thrust member 94, the wall portion 68 of the casing 11, and the resilient element 20. There is then a transfer of force from the first to the second clamping means up to the point at which the annular flange 103 begins to move away from the plate 76. Finally, only the first clamping means exists, and the conditions described with respect to FIG. 1 are restored.

It will quite clearly be seen that the resilient element 20 is mounted in such a way that, as a consequence of the increase in the speed of rotation, the setting up of a coupling or clamping effect causes no modification to be made during the first phase in the clamping effect of the torque limiter and of the friction means forming part of the damping means. During the second phase, however, it causes the clamping torque exerted at the friction ring 102 to diminish to zero, so as to transfer the point of reaction, but without changing the clamping torque of the torque limiter.

Finally, in the last phase, it causes the clamping torque in the torque limiter to increase.

Figure 3:
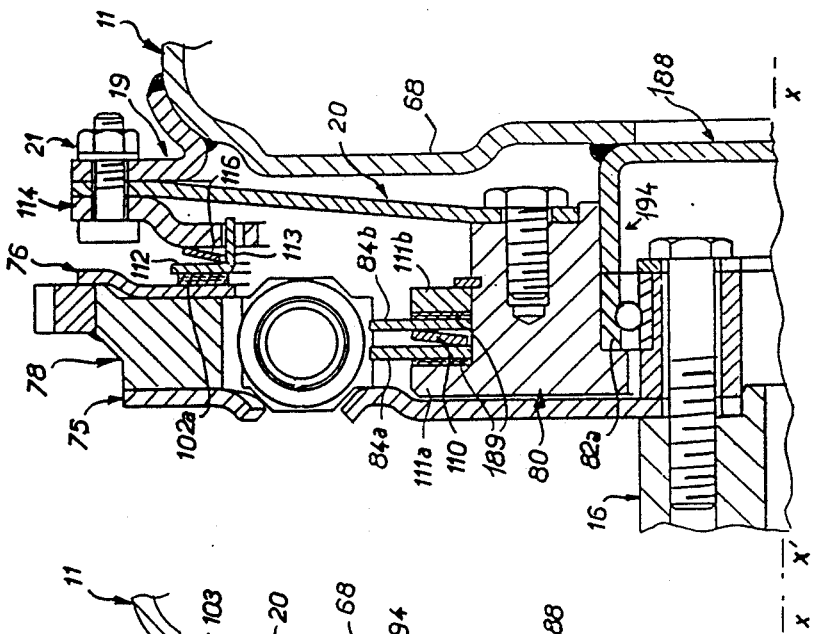
FIG. 3 is a view similar to FIG. 2 but showing a second alternative embodiment.

In the example shown in FIG. 3, the torque limiter is conventional and includes two parallel plates 84a and 84b, between which a spring 110, in the form of a Belleville washer, is interposed. The two friction rings 189 are mounted respectively between each plate and a fixed annular support element, 111a and 111b, which are secured to the hub 80. The activation of the torque limiter is in this case not relevant to the invention, that is to say deformations of the casing 11 have no effect on it.

On the other hand, the damping friction means are connected with the outer periphery of the plate 76 in a way which is similar to that of the case shown in FIG. 2. A friction ring 102a is again to be found, this being fixed to an annular support 112 comprising pads 113 engaged in corresponding holes in a rigid flange 114. The latter is secured to the resilient element 20 and assembled with the pads 19 in the same way as in FIG. 2. The support 112 is therefore connected in this way to the flange 114 for rotation therewith, but it is capable of being displaced axially with respect to the latter. A biasing spring 116, in the form of a Belleville washer, is interposed between the support 112 and the flange 114. The annular support plate 188 further ensures, in this example, that the thrust member 194 performs its function; the plate 188 bears against the outer cage of the bearing 82a. As in the preceding embodments, the damping friction is reduced with speed.

Figure 4:
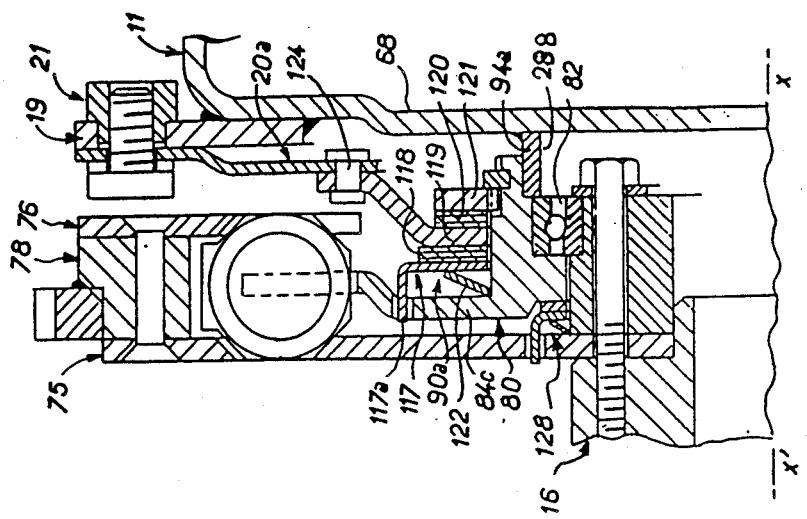
FIG. 4 is a view similar to FIG. 2, but showing a third alternative embodiment.

The embodiment shown in FIG. 4 is chiefly distinguished by the structure of its torque limiter 90a. In this embodiment, the face plate 84c is fixed to the hub 80, and is preferably integral with it. The torque limiter 90a itself, comprises an "axial assembly" consisting of a plurality of members, namely (considered in succession from left to right of FIG. 4) a support ring 117, a first friction ring 118, an annular flange 119, a second friction ring 120, and an abutment 121 which is fixed to the hub 80. The support ring 117 is extended by fingers 117a which are oriented parallel with the axis x'x and engaged in holes in the face plate 84c. It is thus coupled with the hub 80 for rotation with the latter, while being movable axially along the latter. A spring 122, in the form of a Belleville washer, is interposed between the face plate 84c and the support ring 117. The flange 119 is fixed by means of rivets 124 to the inner periphery of the resilient element 20a, the latter being secured to the coupling device in the same way as in the preceding examples. In the present embodiment, the thrust member 94a takes the form of a simple cylindrical sleeve, which is fixed to the casing 11 and abuts against a shoulder of the hub 80. This sleeve is mounted so as to be able to slide with respect to the hub, and thus maintains the damper flywheel and the fluid coupling device in their coaxial relationship. In this embodiment, the ball bearing 82 is not movable longitudinally, while the damping friction means 128 are conventional as in most known damping flywheels; they will therefore not be described in any further detail. Loading of these friction means is independent of any deformations of the casing 11.

With this embodiment, the clamping torque exerted by the torque limiter increases as a function of the expansion of the casing 11 under pressure, but this increase in the clamping torque only takes place at the level of the second friction ring 120, since the flange 119 is biased in the direction of the abutment 121. The construction is altogether more simple and requires fewer components.

However, there would be no departure from the ambit of the invention if, in other particular circumstances of use, the method of clamping the friction means were modified in a way other than that described. It is possible, at will, to increase or decrease the clamping effect of any friction means of the damping flywheel, as a function of either the thrust or the deformation of the casing of the fluid coupling device.

What is claimed is:

1. A fluid coupling device, including a rotatable coupling means comprising, in series, a torsion damping flywheel and a fluid coupling device assembled together by means of a rotatable output portion of said damping flywheel, said damping flywheel including at least one friction means and wherein a clamping means, adapted so as in operation to modify the clamping torque of said friction means, is interposed between a casing of the fluid coupling device and said friction means.

2. A device according to claim 1, wherein said clamping means include a resilient element adapted to modify the clamping torque of said friction means.

3. A device according to claim 2, wherein said resilient element forms part of the means for assembly between the damping flywheel and the coupling device.

4. A device according to claim 3, wherein said friction means comprise a torque limiter of said damping flywheel.

5. A torque transmitting device according to claim 2, of the kind in which said damping flywheel comprises two coaxial parts which are rotatable with respect to each other, and circumferentially acting resilient means interposed between at least one element on hub plate of one of said parts and two parallel annular plates of the other of said parts which are fixed with respect to, and disposed on either side of said hub plate, friction means comprising a torque limiter which comprises two flanges connected to a hub for rotation therewith, said flanges being situated on either side of said hub plate and friction rings interposed between the hub plate and said flanges, wherein one of said flanges is mounted for axial movement with respect to the other one, and a rigid thrust member is interposed between said coupling device and said movable flange against which it bears; and wherein said resilient element has the form of an annular diaphragm, being fixed to said hub in the region of its inner periphery and to said converter in the region of its outer periphery.

6. A device according to claim 5, wherein an annular flange is fixed to the inner periphery of said resilient element, and this flange forms part of a torque limiter disposed in one rotating part of said damping flywheel.

7. A device according to claim 5, wherein the friction means forming part of said damping means comprises a resilient preloading element interposed between one plate of one of the rotatable parts and whole of the other rotatable part, and it further comprises a friction ring interposed between the other said plate and said movable flange.

8. A device according to claim 7, wherein the friction means forming part of the damping means comprise a friction ring interposed between, on the one hand, an annular flange which is fixed to the casing of said fluid coupling device and, on the other hand, said rotatable output portion of the damping flywheel.

* * * * *